United States Patent [19]

Abe

[11] Patent Number: 4,573,372

[45] Date of Patent: Mar. 4, 1986

[54] RACK-PINION STEERING GEAR AND METHOD FOR CUTTING RACK TEETH

[75] Inventor: Michio Abe, Aichi, Japan

[73] Assignee: Tokai TRW & Co., Ltd., Kasugai, Japan

[21] Appl. No.: 763,872

[22] Filed: Aug. 7, 1985

Related U.S. Application Data

[63] Continuation of Ser. No. 459,124, Jan. 19, 1983, abandoned, which is a continuation of Ser. No. 106,930, Dec. 26, 1979, abandoned.

[30] Foreign Application Priority Data

Dec. 27, 1978 [JP] Japan ............................ 53-162363

[51] Int. Cl.$^4$ ...................... F16H 19/04; F16H 55/26
[52] U.S. Cl. ......................................... 74/422; 74/498
[58] Field of Search ...................... 74/422, 498; 280/96

[56] References Cited

U.S. PATENT DOCUMENTS

| | | | |
|---|---|---|---|
| 3,267,763 | 8/1966 | Merritt | 74/422 |
| 3,605,933 | 9/1971 | Millard | 280/96 |
| 3,950,006 | 4/1976 | Wood | 280/96 |
| 4,008,627 | 2/1977 | Bradshaw et al. | 74/498 |
| 4,016,774 | 4/1977 | Baker et al. | 74/422 |
| 4,240,306 | 12/1980 | Adams et al. | 74/498 |

FOREIGN PATENT DOCUMENTS

| | | | |
|---|---|---|---|
| 2223527 | 12/1972 | Fed. Rep. of Germany. | |
| 2809211 | 9/1978 | Fed. Rep. of Germany. | |
| 609356 | 9/1948 | United Kingdom | 74/498 |
| 1356172 | 6/1974 | United Kingdom. | |

*Primary Examiner*—Lawrence J. Staab
*Attorney, Agent, or Firm*—Yount & Tarolli

[57] ABSTRACT

This invention pertains to a rack and pinion type steering gear for an automobile and a method for cutting rack teeth in the gear. The gear comprises a housing, a pinion rotatably supported within the housing and operatively connected to a steering wheel and a rack bar supported within the housing for slidable movement in the axial direction and rotation and provided with rack teeth in engagement with the pinion. The rack teeth are formed on the rack and along a varying pitch line so that the axial movement amount of the rack varies as the pinion rotates.

5 Claims, 6 Drawing Figures

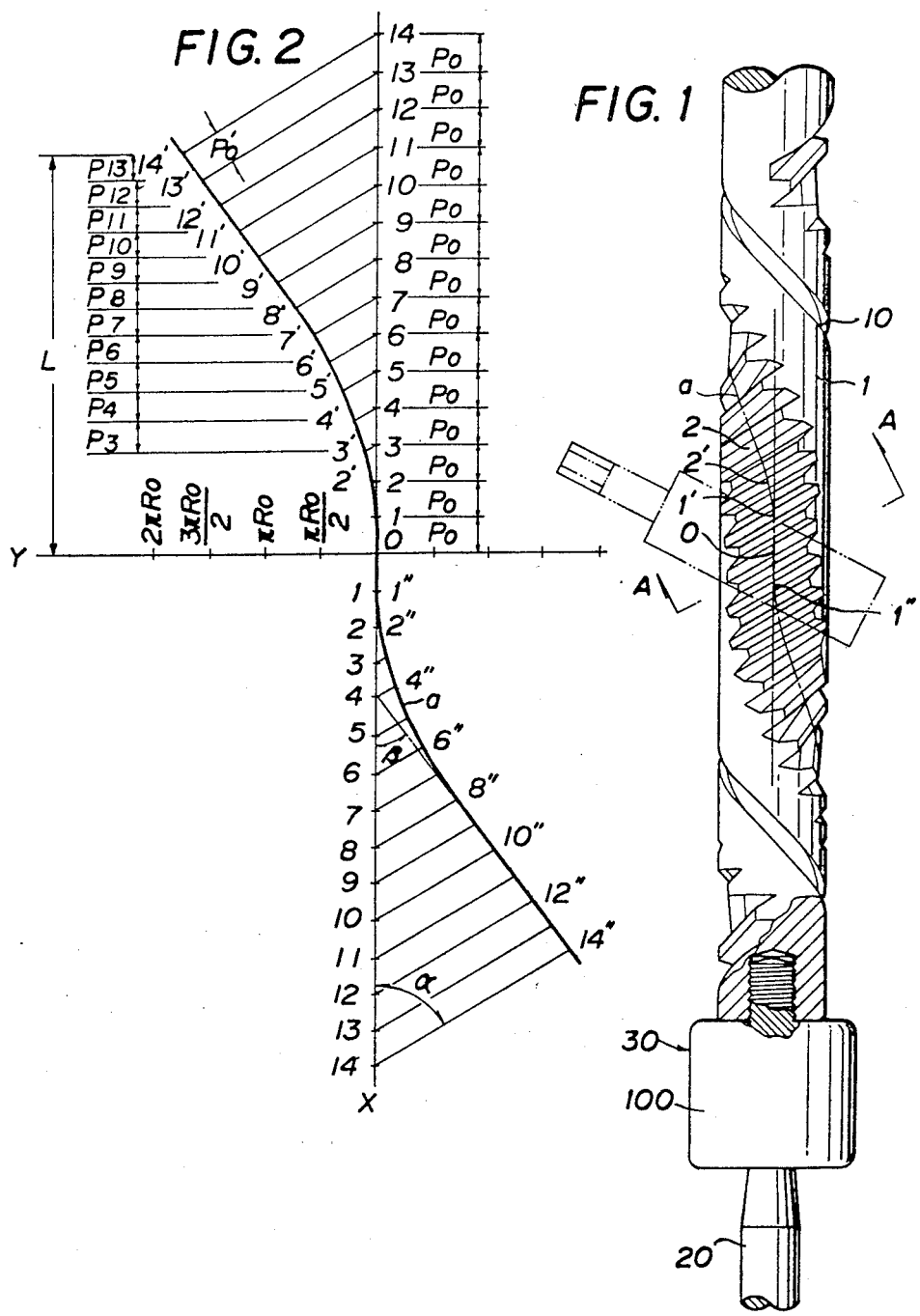

RACK-PINION STEERING GEAR AND METHOD FOR CUTTING RACK TEETH

This is a continuation of co-pending application Ser. No. 459,124 filed on Jan. 19, 1983, now abandoned, which itself is a continuation of application Ser. No. 106,930, filed on Dec. 26, 1979 now abandoned.

BACKGROUND OF THE INVENTION

This invention relates to a rack-pinion steering gear for use in the steering system of an automobile and more particularly, to an improved variable ratio rack-pinion steering gear having an overall steering ratio (the rotation angle of the steering wheel and wheels).

A variety of variable ratio rack-pinion steering gears of the above type and have been proposed hithertofore and some of the prior art variable rack-pinion steering gears are disclosed in British Pat. Nos. 609,356 and 1,356,172, Laid-Open German Patent Application No. 2,223, 527 and U.S. Pat. No. 3,267,763, for example. However, various difficulties are encountered in the manufacture of the variable ratio rack-pinion steering gears disclosed in these patents and patent application. The variable ratio rack-pinion steering gear of British Pat. No. 1,356,172 had the disadvantages that the manufacture of the rack bearings was not easy, the performance of the rack end ball joint was not satisfactory and the strength of the rack teeth is not sufficient. The variable ratio rack-pinion steering gears of British Pat. No. 609,356 and Laid-Open German Patent Application No. 2,223,527 had the disadvantage that the provision of the sleeve on the rack increased the volume of the gear and production cost. The variable ratio rack-pinion steering gear of U.S. Pat. No. 3,267,763 had the disadvantage that the production of the rack teeth was not easy and the speed change ratio was inadequate.

SUMMARY OF THE INVENTION

Accordingly, the principal object of the present invention is to provide a practically useful rack-pinion steering gear in which the rack bar is provided with rack teeth along a varying pitch line comprising a composite curve which includes an axial direction line component and a spiral line component whereby as the pinion in engagement with the rack teeth rotates normally, the rack bar moves in the axial direction at a varying speed.

Another object of the present invention is to provide a rack end ball joint attached to each end of a rack bar which moves in the axial direction while rotating about its own axis to connect the rack bar to the associated tie rod. The ball end joint has a high rocking torque and a low rotation torque.

Another object of the present invention is to provide a high performance and low cost variable ratio rack-pinion steering gear which comprises components substantially similar to the corresdponding components of a standard rack-pinion steering gear whereby the variable ratio rack teeth can be easily and economically produced and the automatic movement of the rack bar in the axial direction while rotating about its own axis will not have any adverse effect on the rack end ball joints at the opposite ends of the rack bar.

In accordance with the invention, there is provided a rack and pinion type steering gear for an automobile comprising a housing, a pinion rotatably supported in the housing to receive turning effort from a steering wheel in the automobile, and a rack meshed with the pinion and supported in the housing for slidable movement in the axial direction and rotation. The rack is connected to a tie rod which is in turn connected to wheels of the automobile.

The rack teeth are directly formed on the rack and along a varying pitch line. The varying pitch line comprises a straight portion extending along the axis of the rack and disposed in the center area of the rack and a helical line extending from the ends of the straight line. As a result, the movement amount of the rack in the axial direction varies as the pinion rotates. The rack teeth are formed on the rack by moving the rack along the varying pitch line and linearly moving a hob cutter along a line at an angle with respect to the axis of the rack.

The rack is connected to the tie rod by means of a ball joint in which the rocking torque is high and the rotation torque is low.

BRIEF DESCRIPTION OF THE DRAWINGS

The above and other objects and features of the invention will be understood with reference to the accompanying drawings in which;

FIG. 1 is a side elevational view of a preferred embodiment of the rack-pinion steering gear constructed in accordance with the present invention showing a portion thereof in section;

FIG. 2 is a developed view of one form of the rack teeth;

DETAILED DESCRIPTION OF THE PREFERRED EMBODIMENTS

First, referring to FIG. 1 in which the preferred embodiment of the rack-pinion steering gear of the invention is shown in partial section and the gear generally comprises an elongated rack bar 1. The rack bar 1 has rack teeth 2 thereon and is supported in a housing (not shown) for rotation an axial movement. Rotatably supported in the housing is a pinion 3 which is in engagement with the rack teeth 2 on the rack bar 1 in the manner as will be described hereinafter. The pinion 3 is of a conventional type and connected at the upper end 3a to the steering wheel rod of an automobile (not shown). Thus, the pinion is imparted thereto a rotational movement from the steering wheel.

Figure 3:
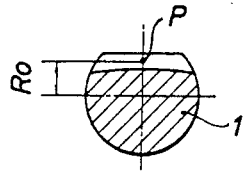
FIG. 3 is a cross-sectional view of the rack bar taken along substantially the line A—A of FIG. 1.
Figure 5:
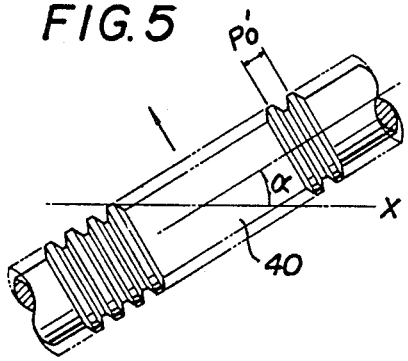
FIG. 5 is a side elevational view of a hob cutter employed in forming the rack teeth on the rack bar.

The rack teeth 2 are directly formed on the rack bar 1 by tapping and have the configuration shown in detail in FIG. 2. That is, on the axis X which corresponds to the axis of the rack bar, reference character O denotes the engaging point between the rack bar and pinion as the rack bar moves linearly and two sets of standard rack pitch points 1–14 are shown on the opposite sides of the engaging point O. Reference character a denotes a varying pitch line for varying the movement amount of the rack bar 1 in the axial direction as the pinion rotates. The rack teeth are formed along the varying pitch line. In FIG. 5, the angle α denotes the helical angle of the rack teeth and reference character β denotes the lead angle of the rack teeth 2 with respect to the axis of the rack bar 1. The intersecting points 1'-14' between the lines drawn from the pitch points on the axis 0 at the angle α and a pitch line a denote the pitch points of the rack teeth. In FIG. 3, reference character Ro denotes the center pitch position of the rack teeth 2 at the pitch point P. Assuming that the distance between the pitch point P and the center of the rack bar is Ro, the rotation angle of the rack teeth 2 can be shown on the Y line. That is, when the rack bar 1 moves by the amount of L in the axial direction and rotates by the amount of about 2πRo as the rack bar and pinion mesh with each other covering the distance from the point O to the point 14' (see FIG. 2). The rack teeth 0-14' will have the same pitch at the angle α with respect to the axis of the rack bar 1 and the same configuration.

In FIG. 2, the vertical distance between the points 1'-14' has been designated $P_0$-$P_{13}$, the $P_2$ designation being omitted to provide space for the designation of rack bar rotation. The vertical distances between the points 1'-14' is the distance between similar points on successive teeth when measured in projection from the points along paths extending perpendicular to the central axis of the rack, that is, along horizontal paths extending perpendicular to the vertical axis of the rack. The distances $P_0$-$P_{13}$ have been shown in FIG. 2 projected along a vertical axis which is offset from the vertical axis of the rack.

The rack tooth pitch line a is formed as a uniform acceleration curve in the distance from the rack teeth 0 to 6', the movement amount of the rack bar as the pinion rotates in the vicinity of the straight advancement section of the steering (referred to as "rack travel" hereinafter) corresponds to the pitch of the pinion, the rack travel decreases gradually in the distance from the rack teeth 1' to 6' and the desired rack travel deceleration ratio (about 50%) is attained at the rack tooth 7'. The rack travel deceleration ratio attained at the point or tooth 7' is maintained in the distance from the rack teeth 7' to 14'. Needless to say, the pitch line a of the rack teeth can be selected so as to have a suitable curve by taking into consideration the desired steering performances of the automobile such as rectilinear propagation stability, steering force and steering efficiency. It may seem at glance difficult to form the rack teeth on the rack bar as in the present invention or the rotary sleeve as shown in British Pat. No. 639,356 and Laid-Open German Patent Application No. 2,223,527. According to the present invention, as understood from FIGS. 1 and 2, a hob cutter 40 (FIG. 5) having the length corresponding to the distance between the points 14-14' and the pitch corresponding to the distance $P'_o$ between the points 13'-14', but no lead angle is disposed at the angle α with respect to the axis of the rack bar and moved in the arrow direction rotating at a linear or constant speed within the distance between the points 14'-7', at a reduced speed along the curved or acceleration line within the distance between the points 6'-0, at 0 speed within the distance spanning the points 1'-0-1", at an acceleratedly increment speed within the distance spanning the points 0-1"-6" and at a constant speed within the distance between the points 7"-14" while simultaneously being imparted thereto a pitch correction rotation in the axial direction of the rack bar to thereby cuts teeth on the rack bar along the pitch line a. In this way, a variable (variable speed) rack bar can be produced in a simple and short time. The processing of the rack teeth on the rack bar can be also performed by the gear shaping process by the use of a means adapted to impart the rotation to the rack bar in relation to the progress of the rack tooth cutting. By the combination of the specific helical angle α and pitch line a, the rack tooth cutting can be relatively easily performed by the adoption of the system in which a small amount of movement in the axial direction is imparted to the rack bar simultaneously with the rotation of the rack bar. Any rack tooth formed by the hob cutter and the other composite cutting means as stated above becomes generated tooth and therefore has an accurate crest and bottom. Although the curvature of such teeth varies depending upon the factors such as the diameter and the lead angle of the rack bar and the diameter of the cutter employed, there is no difficulty such as undesirable interfere by the teeth on the pinion in engagement with the rack teeth. The rack teeth formed on the rack bar in a substantially spiral arrangement as mentioned hereinabove are adapted to automatically impart a rotation to the rack bar by their engagement with the pinion teeth, but in order to obtain a smooth rotation of the rack bar, a guide means is provided on the rack bar and housing, respectively. The guide means preferably comprise cam grooves 10, 10 formed in the cylindrical surface of the rack bar on the opposite sides of the toothed portion of the rack bar along the lines parallel to the pitch line a and projections such as stationary keys formed on the housing for engaging in the cam grooves.

The above-mentioned rack bar is connected to the tie rod through the ball joint 30 having the specific construction of the present invention.

In the rack-pinion steering gear of the present invention, since the rack bar is designed to rotate in response to the rack travel, it is necessary that the rotation of the rack bar will not impart a twist movement to the ball stud 20 at the tie rod end and the tie rod end ball joint connected to the ball stud (FIG. 1) which may otherwise lead to a substantial mechanical loss of the rotation of the rack bar. In order to attain this purpose, according to the present invention, it is necessary to provide a rack end ball joint whereby a minimum resistance is offered to the rotation of the rack bar and at the same time, the rocking torque of the ball stud will become a predetermined value whatever angle the axes of the ball stud and rack may assume.

Figure 6:
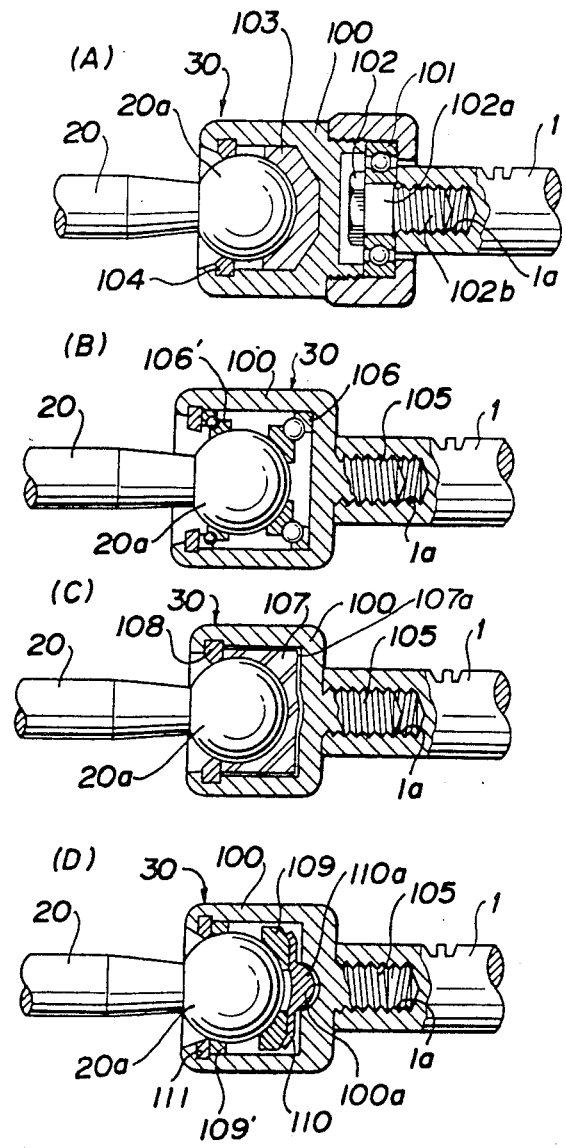
FIG. 6A–D are cross-sectional views of different embodiments of the rack end ball joint according to the present invention.

Referring to FIGS. 6A-6D, there is shown details of different embodiments of the ball joint 30 of the present invention. The ball joint of FIG. 6A has a housing 100. One end of the housing 100 receives ball bearing 101 the outer races of which are fixedly secured to the housing 100 whereas the inner races receive a bolt 102. The shank 102a of the bolt 102 engages in the inner races of the ball bearing 101 and has at the outer end a threaded portion 102b in a threaded bore 1a formed at the adjacent end of the rack bar 1. The other end of the housing 100 is formed with a recess in which a cup-shaped bearing 103 is received and the bearing 103 in turn slidably receives the ball portion 20a formed at the end of the tie rod ball stud 20. And a ring-shaped bearing 104 is provided within the recess in the housing 100 adjacent to the open side of the recess and slidably receives the ball portion 20a on the tie rod ball stud 20. In the embodiments of FIGS. 6B-D, the ball bearings 101 are eliminated and instead, an externally threaded boss 105 extends outwardly from one end or the right-hand end of the housing 100 and is threaded in the threaded bore 1a at the adjacent end of the rack bar 1 to thereby directly secure the housing to the rack bar. In the embodiment of FIG. 6A, the ball portion 20a is supported by a pair of bearings 106, 106' in the form of a ball bearing, in the embodiment of FIG. 6C, the ball portion 20a is supported by a cup-shaped bearing 107 which has at the outer periphery an oil groove 107a for its smooth rotation and surrounds a substantial portion of the ball portion and a ring-shaped bearing 108 which surrounds a minor portion of the ball portion and in the embodiment of FIG. 6D, the ball portion 20a is supported by a pair of bearings 109, 109' in the form of a ring. One of the bearings 109 is backed up by a backing member 110 which is in turn received in the housing 100 whereas the other bearing 109' is supported in the housing by means of an annular closure member 111. The backing member 110 has a spherical leg 110a which is received in a corresponding spherical recess 100a formed in the closed bottom of the recess in the housing 100.

With the above-mentioned construction and arrangement of the parts of the several embodiments of the ball joint as shown and described hereinabove, the connection between the rack bar and tie rod rocks with a torque within a predetermined range and the rack bar 1 can rotate with a low torque without substantially affecting the ball joint portion.

Figure 4:
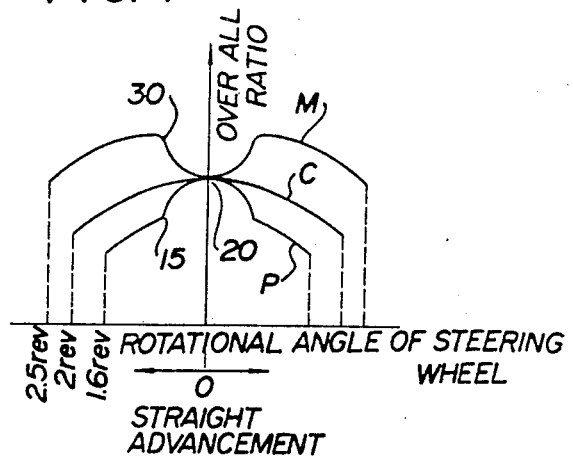
FIG. 4 is a graph showing the overall ratios of manual and power steering systems.

The rack-pinion steering gear of the invention as described hereinabove can be equally applied to manual or power steering. In FIG. 4, M denotes a manual overall ratio, P denotes a power overall ratio and C denotes a constant ratio. Particularly, according to the present invention, when the rack-pinion steering gear is employed in conjunction with a manual steering system, the stability in the straight advancement and steering efficiency are improved to thereby reduce the power required for steering. And when the rack-pinion steering gear of the invention is employed in conjunction with a power steering system, in addition to the above-mentioned effects, the frequency of the steering wheel rotation can be reduced.

According to the present invention, by the arrangement in which the variable rack teeth are directly formed on the rack bar, the steering ratio can be selected within a wide range (50%–80%) and the stability while moving on a straight line and the steering efficiency at a low speed drive and parking can be substantially improved. And the accessory parts such as the rotary sleeve, auxiliary gears and so on necessary in the prior art rack-pinion steering gears can be eliminated from the rack-pinion steering gear of the invention and the weight and production cost of the rack-pinion steering gear can be reduced accordingly. In addition, since any part of the rack bar except for the portion where the rack teeth are formed is not subjected to machining force when the rack teeth are machined, the support bearings for the rack bar may be the same simple ones employed in the conventional constant ratio type rack-pinion steering gears. In the device shown in British Pat. No. 609,356, since a rotary sleeve having threads formed over the entire outer surface thereof is employed, great difficulty is encountered in the manufacture of the bearings. Furthermore, according to the present invention, in spite of the fact that the rack-pinion steering gear affords a wider range of gear ratios over those available in the conventional constant ratio rack-pinion steering gears, and the present invention provides practical advantages that the increase in production cost and weight due to such increase in the rack-pinion ratio can be minimized. Furthermore, there is the advantage that the rack teeth can be directly formed on the rack bar.

While several embodiments of the invention have been shown and described in detail it will be understood that the same are for illustration purposes only and not to be taken as a definition of the invention, reference being had for this purpose to the appended claims.

What is claimed is:

1. A rack for use in a variable ratio rack and pinion steering gear, said variable ratio rack including a longitudinally extending rack member having a straight central axis, a longitudinally extending array of rack teeth wrapped at least part way around the rack member for engaging a pinion during rotation of the pinion and axial movement of the rack member, said array of rack teeth curving around the rack member in a first longitudinal direction from a central portion of the array of teeth to a first end portion of the array of teeth and curving around the rack member in a second longitudinal direction from the central portion of the array of teeth to a second end portion of the array of teeth, said array of rack teeth having a pitch line which curves around the rack member in the first longitudinal direction from the central portion of the array of teeth to the first end portion of the array of teeth and which curves around the rack member in the second direction from the central portion of the array of rack teeth, said array of rack teeth including teeth disposed in the central portion of the array of teeth and having a first distance between similar points on successive teeth when measured in perpendicular projection along an axis parallel to and offset from the central axis of said rack member, teeth disposed in the first end portion of the array of teeth and having a second distance between similar points on successive teeth when measured in perpendicular projection along said axis which is parallel to and offset from the central axis of said rack member, and teeth disposed in the second end portion of the array of teeth having the second distance between similar points on successive teeth when measured in perpendicular projection along said axis which is parallel to and offset from the central axis of said rack member, said second distance being different from said first distance, at least some of said rack teeth including flank surface means for interacting with the pinion to rotate the rack member and vary the amount of movement of said rack member in an axial direction under the influence of forces applied against said rack member by the pinion during equal increments of rotation of the pinion.

2. A rack as set forth in claim 1 wherein the helix angle to the central axis of said rack member of the teeth in the first end portion of said array of rack teeth is different than the helix angle to the central axis of said rack member of teeth in the central portion of said array of rack teeth.

3. A rack as set forth in claim 2 wherein the helix angle to the central axis of said rack member of the teeth in the first end portion of said array of rack teeth is larger than the helix angle to the central axis of said rack member of the teeth in the central portion of said array of rack teeth.

4. A rack as set forth in claim 1 wherein the distance between similar points on successive teeth when measured along the pitch line is the same for the teeth in the central and end portions of the array of rack teeth.

5. A rack for use in a variable ratio rack and pinion steering gear, said variable ratio rack including a longitudinally extending rack member having a straight central axis, a longitudinally extending array of rack teeth wrapped at least part way around the rack member for engaging a pinion during rotation of the pinion and axial movement of the rack member, said array of rack teeth curving around the rack member in a first longitudinal direction from a central portion of the array of teeth to a first end portion of the array of teeth and curving around the rack member in a second longitudinal direction from the central portion of the array of teeth to a second end portion of the array of teeth, said array of rack teeth having a pitch line which curves around the rack member in the first longitudinal direction from the central portion of the array of teeth to the first end portion of the array of teeth and which curves around the rack member in the second direction from the central portion of the array of rack teeth, said array of rack teeth including teeth disposed in the central portion of the array of teeth and having a first distance between similar points on successive teeth when measured in perpendicular projection along an axis parallel to and offset from the central axis of said rack member, teeth disposed in the first end portion of the array of teeth and having a second distance between similar points on successive teeth when measured in perpendicular projection along said axis which is parallel to and offset from the central axis of said rack member, and teeth disposed in the second end portion of the array of teeth having the second distance between similar points on successive teeth when measured in perpendicular projection along said axis which is parallel to and offset from the central axis of said rack member, said second distance being different from said first distance, said teeth in the first and second end portions and the central portion of the array of teeth having the same distance between similar points on successive teeth when measured along the pitch line, said teeth in the first and second end portions of the array of teeth having a first helix angle with the central axis of said rack member, said teeth in the central portion of the array of teeth having a second helix angle with the central axis of said rack member, said second helix angle being different from said first helix angle.

* * * * *